United States Patent
Wildeman

(10) Patent No.: US 6,562,434 B1
(45) Date of Patent: May 13, 2003

(54) GEL-LIKE FABRIC COMPOSITE

(75) Inventor: Martin Wildeman, Spartanburg, SC (US)

(73) Assignee: Tietex International, Inc., Spartanburg, SC (US)

( * ) Notice: Subject to any disclaimer, the term of this patent is extended or adjusted under 35 U.S.C. 154(b) by 0 days.

(21) Appl. No.: 09/398,748

(22) Filed: Sep. 17, 1999

(51) Int. Cl.[7] .................................................. B32B 9/00
(52) U.S. Cl. .............................. 428/102; 5/464; 5/470; 5/481; 428/104; 428/196; 428/357; 428/365; 428/391; 428/395; 428/398
(58) Field of Search ................................ 428/102, 104, 428/196, 357, 365, 391, 395, 398; 5/464, 470, 481

(56) References Cited

U.S. PATENT DOCUMENTS

| | | |
|---|---|---|
| 3,597,941 A | 8/1971 | Jindra et al. |
| 3,649,428 A | 3/1972 | Hughes |
| 4,631,933 A | 12/1986 | Carey, Jr. |
| 4,876,128 A | 10/1989 | Zafiroglu |
| 4,891,957 A | 1/1990 | Strack et al. |
| 5,187,952 A | 2/1993 | Zafiroglu |
| 5,398,354 A * | 3/1995 | Balonick ...................... 5/464 |
| 5,698,289 A | 12/1997 | Kolzer |
| 5,710,080 A * | 1/1998 | Pellegrini .................... 442/304 |
| 5,882,765 A | 3/1999 | Pastureau et al. |

FOREIGN PATENT DOCUMENTS

| | | |
|---|---|---|
| DE | 34655 | 1/1965 |
| FR | 2662066 | * 11/1991 |

OTHER PUBLICATIONS

PCT International Search reported dated Dec. 28, 2000.
German article, Heinz Kemter, 59 two-sided pages, 1965 (not translated).
Sinker Pile Fabrics, Chapter 16 of textbook of unknown title, pp. 173–179.

* cited by examiner

*Primary Examiner*—Nasser Ahmad
(74) *Attorney, Agent, or Firm*—Dority & Manning

(57) ABSTRACT

A fabric composite product is disclosed. The fabric composite is formed from at least two (2) layers that are connected by loop pile stitches. For instance, in one embodiment, the fabric composite includes a fill layer positioned in between two (2) outer fabric layers. The fill layer contains high loft fibers. For example, in one embodiment, the fill layer is made from siliconzied fibers. The loop pile stitches connect the layers together without substantially compressing the fill layer. In this manner, the fabric composite has good cushioning properties and has a gel-like feel.

29 Claims, 2 Drawing Sheets

GEL-LIKE FABRIC COMPOSITE

FIELD OF THE INVENTION

The present invention is generally directed to a composite fabric product. More particularly, the present invention is directed to a composite fabric product having a gel-like feel. In one embodiment, the composite fabric product is made from a three-layer substrate held together by loop pile stitches in which the middle layer comprises a non-woven web made from siliconized fibers.

BACKGROUND OF THE INVENTION

In the past, numerous and varied fabrics have been produced on stitch bonding machines, as well as various warp knitting machines. For instance, fabrics have been produced on such types of machines where varied elements have been utilized in the construction of the fabric. For example, plural layers of webs or plural yarns have been placed atop various webs to afford certain structural and/or aesthetic qualities to the finished product. In one embodiment, on certain stitch bonding machines such as a Maliwatt machine, a fleece or web of fibers is fed through the throat of the machine where the web is stitched across its width to impart integrity to the fleece or web.

In the examples set forth above, the primary purpose of the exercise has been simply to provide an alternative or modification to conventional knitting in order to provide a fabric structure for various specific and/or aesthetic purposes. The fabric structures produced have included one or more layers or substrates held together in a juxtaposed orientation by a thread system of knit stitches.

The present invention is directed to further improvements in multi-layered fabric products. For instance, as will be described in more detail below, the present invention is directed to a composite fabric product having a gel-like feel not before realized by prior art constructions and methods.

SUMMARY OF THE INVENTION

As stated above, the present invention is directed to further improvements in prior art constructions and methods.

Accordingly, it is an object of the present invention to provide an improved fabric composite which has enhanced functional and/or aesthetic qualities.

Another object of the present invention is to provide an improved composite fabric structure with a gel-like feel that can provide insulation and cushioning where needed.

Still another object of the present invention is to provide an improved composite fabric structure having multiple layers that are united by an independent thread system.

Yet another object of the present invention is to provide an improved composite fabric having multiple layers bound together with a filler substrate by a loop stitching technique.

Generally speaking, the improved composite according to the present invention comprises multiple layers of preformed substrates and a stitch bonding system interconnected with the substrates to create a gel-like feeling composite.

In one embodiment, the composite fabric product of the present invention includes at least one outer fabric layer and a fill layer. When the product contains two outer fabric layers, the fill layer is positioned in between the outer layers. The fill layer comprises a nonwoven web containing high loft fibers. In accordance with the present invention, a plurality of stitches connect each of the layers together. Specifically, the stitches connect the layers together without substantially compressing the fill layer. For example, the stitches can be loop pile stitches formed using a loop pile sinker technique on a stitch bonding machine.

As described above, the fill layer is comprised of high loft fibers. For instance, the fibers, in one embodiment, have an openness value of from about 2.0 to about 4.0, and particularly have an openness value of at least 2.5. The high loft fibers can be crimpy fibers, containing from about 5 to about 15 crimps per inch, and particularly containing at least 8 crimps per inch. The high loft fibers can be made from either natural or synthetic materials.

In one embodiment, the high loft fibers are siliconized fibers, such as hollow polyester siliconized fibers. The siliconized fibers can have a denier of from about 6 to about 30, and can particularly have a denier of about 15. The basis weight of the fill layer can vary depending upon the application. For most applications, however, the fill layers will have a basis weight of from about 200 gsm to about 800 gsm.

The outer fabric layers of the composite fabric product of the present invention in general can be any material capable of accepting the loop stitches. The outer layers can be, for instance, woven fabrics, nonwoven fabrics, knitted fabrics, and films. In one embodiment of the present invention, the outer layers are warp knitted fabrics.

As described above, the fabric composite is held together by loop pile stitches. When using a stitch bonding machine to create the stitches, the stitches can be placed in a plurality of rows, such as from about 12 to about 20 rows per inch, and particularly at about 14 rows per inch. Each row can contain from about 7 to about 28 stitches per inch. The yarn used to form the stitches can have a denier of from about 100 to about 200 and can be heat stable containing substantially no residual shrinkage.

In one embodiment of the present invention, after the composite fabric is formed, at least one surface of the product can be sanded. For instance, a sanding device containing sanding rolls can be used. Sanding a surface of the composite product frays the loop pile stitches without substantially breaking the stitches. Of particular advantage, sanding causes the surface of the product to be softer and to have a feel like flannel.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
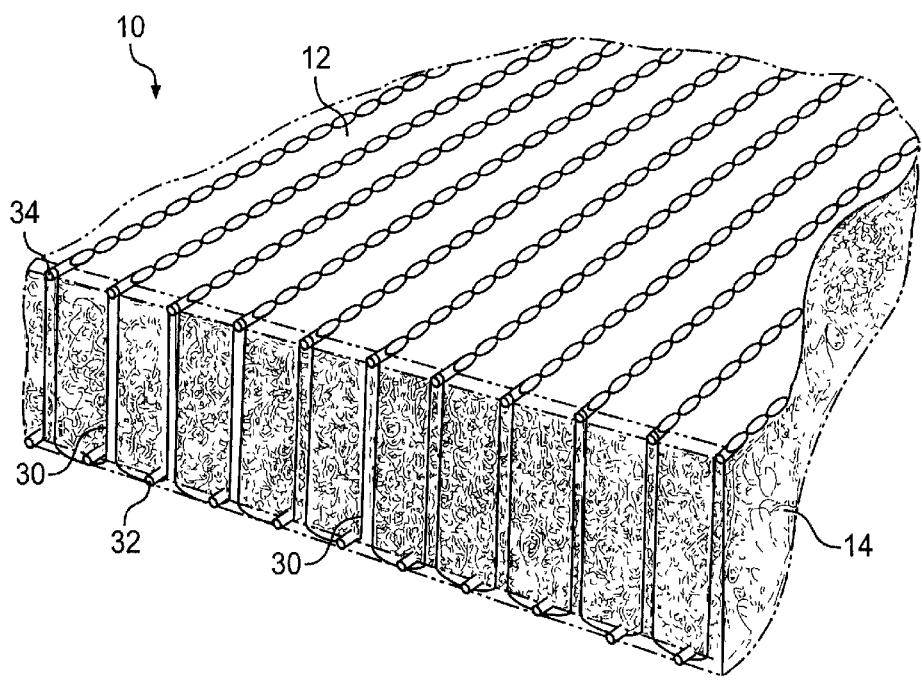
FIG. 1 is perspective view of one embodiment of a composite fabric made in accordance with the present invention.

Repeat use of reference characters in the present specification and drawings is intended to represent same or analogous features of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention.

The present invention is generally directed to a composite fabric which is easy to manufacture, provides cushioning and has good moisture management properties, insulating properties and ventilating properties. The benefits are not mutually exclusive, however, in optimizing each aspect of the fabric depending on the embodiment.

In general, the present invention is directed to a loop stitched composite fabric with a spongy fill layer attached to one or two outer layers. The composite fabric is constructed so as to have a unique gel-like feel. The gel-like feel of the fabric is created by utilizing a high loft fiber fill, such as a siliconized fiber web and attaching the fill layer to the one or two outer layers by a loop pile stitching technique.

Composite fabric products made in accordance with the present invention have a distinctive and aesthetic appearance and are well suited for use in a variety of applications. For instance, fabric products made in accordance with the present invention are well suited for cushioning applications. For example, the present invention can be used in footwear in order to surround, support, and provide cushioning to a foot. Alternatively, fabric products made according to the present invention can be used in automotive applications, such as headliners.

The fabric products can also have great acoustic properties making them well suited for use in applications where noise insulation is desired. For example, composite fabrics made in accordance with the present invention can be used in constructing office panels and other such similar dividers.

Making reference to the Figures, preferred embodiments of the present invention will now be described in detail.

Referring to FIG. 1, a composite fabric product generally indicated as 10 is shown having a first outer substrate 12 and a second outer substrate 16. A fill layer or substrate 14 is positioned in between the two outer substrate layers. In accordance with the present invention, a system of stitch bonding yarns 30 unites substrates 12, 16 and 14 together. The stitch bonding yarn 30 connects substrates 12, 16 and 14 by looping over the outer substrates 12 and 16, and by passing through fill layer 14. As shown in the figures, for diagrammatical purposes only, stitchbonding yarn 30 is shown engaging yarns 32 and 34 contained in the outer substrates.

Figure 2:
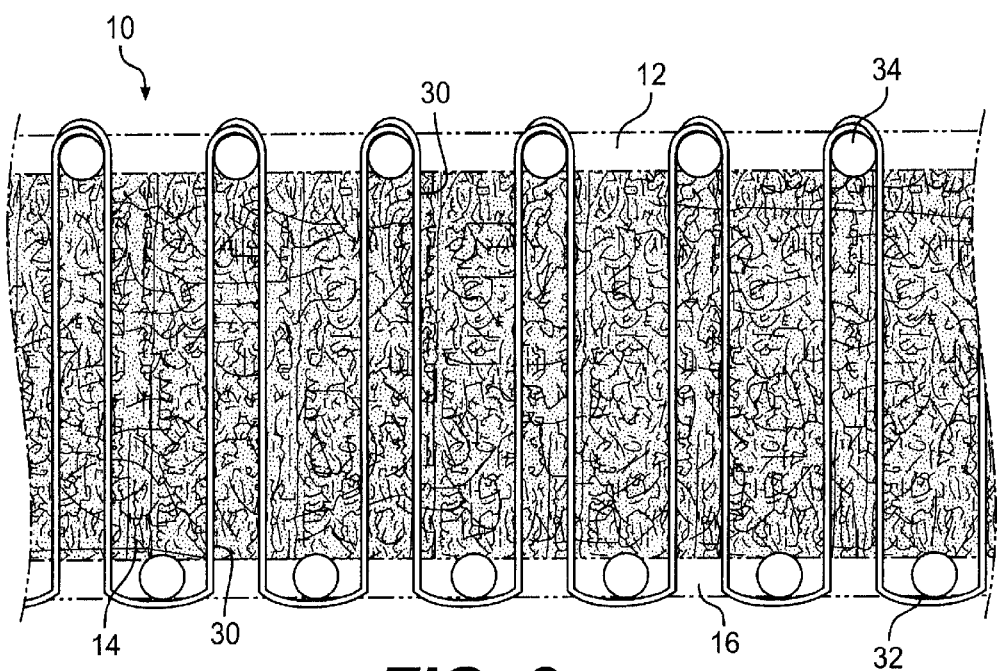
FIG. 2 is a cross-sectional view of the composite fabric illustrated in FIG. 1.

FIG. 2 illustrates a cross-sectional view of the fabric composite illustrated in FIG. 1. FIG. 2 more clearly illustrates in a diagrammatical fashion the looping of stitch bonding yarn 30 around the outer substrates 12 and 16 and the passing of the stitch bonding yarn 30 through the filler substrate 14.

As to fabric composites made according to the present invention, first and second preformed, outer substrates 12 and 16 respectively may take any form that is desired for the particular end use of the composite so long as the substrate can be pierced by the stitch bonding needles with the subsequent generation of loop stitches therebetween. In one embodiment, outer substrates 12 and 16 are each warp knit tricot fabrics, which are fabrics that are knit with the yarns running lengthwise.

Figure 3:
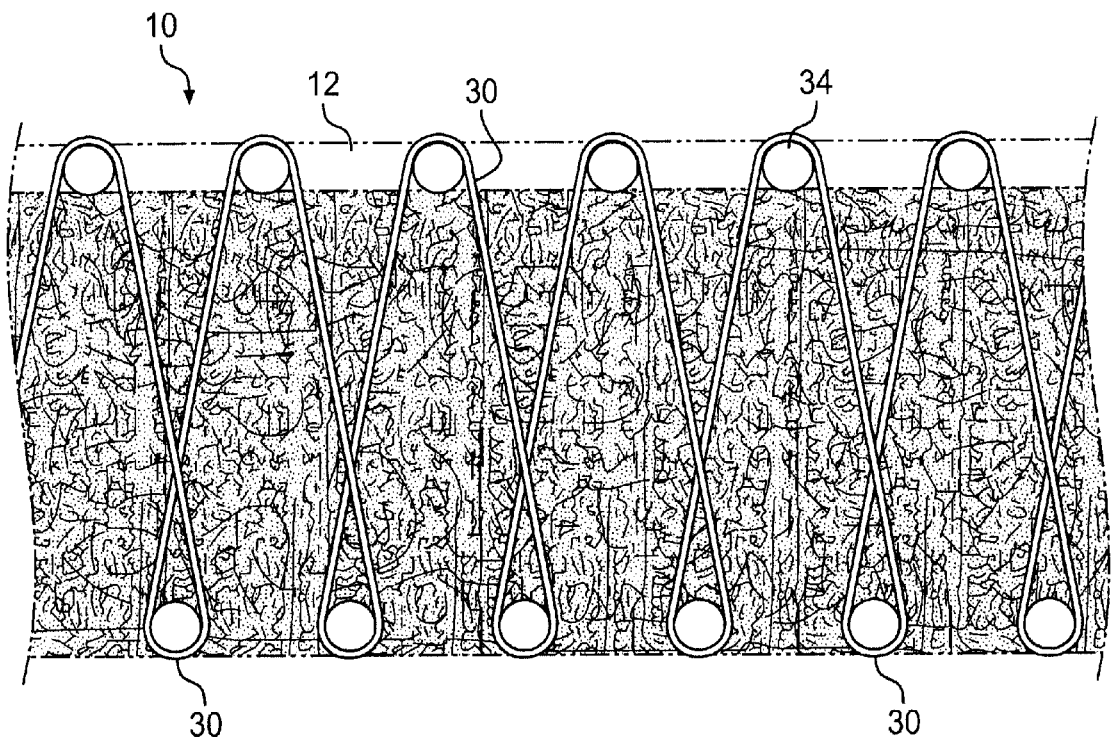
FIG. 3 is a cross-sectional view of an alternative embodiment of a fabric composite made in accordance with the present invention.

Substrates 12 and 16, however, could be, by way of example and without limitation, woven fabrics, non-woven fabrics, knit fabrics, films, hydroentangled non-woven webs, two bar tricot fabrics, or other versions of non-wovens or fleeces as long as the outer substrate is rigid enough to hold a stitch. The two outer substrates can be of the same or different materials. Furthermore, there is no necessity for two substrates to create the composite fabric. As illustrated in FIG. 3, the present invention embodies a composite with one outer substrate 12 and a filler substrate 14.

In general, fill layer 14 can be made from any suitable high loft fiber, including natural fibers and synthetic fibers. In one embodiment, filler substrate 14 comprises siliconized fibers. As used herein, a siliconized fiber refers to a fiber that has been treated with a silicone composition. In general, siliconizing a fiber reduces the coefficient of friction on the surface of the fiber.

Various types of fibers can be siliconized and used in accordance with the present invention. In one embodiment, however, hollow siliconized polyester fibers are used. The fibers can generally have a denier of from about 6 to about 30 and particularly at a denier of about 15. Suitable siliconized fibers that may be used in the present invention are commercially available from the Hoechst Celanese Corporation. The fibers can generally have a length of from about 2 inches to about 4 inches and particularly at a length of about 3 inches.

Whether or not the fibers used to produce fill layer 14 are siliconized, the fibers should have high loft characteristics. In this regard, the fibers should have a high crimp density. For example, the fibers can have from about 5 to about 15 crimps per inch and particularly can have from about 8 to 10 crimps per inch. Further, the fibers can have an openness value of from about 2 to about 4, and particularly from about 2.5 to about 3.5 (as determined by Test Method No. SD-34025).

Other characteristics of fill layer 14 can also vary depending upon the particular application. In general, fill layer 14 can be made with fibers having a denier of from about 6 to about 30, and particularly at a denier of about 15. The basis weight of fill layer 14 can be from about 200 gsm to about 800 gsm. For purposes of illustration only, in one embodiment, fill layer 14 has a thickness of from about 6 to about 7 millimeters.

As shown in FIGS. 1 and 2, the composite fabric is held together by a loop stitching technique where yarn 30 forms loops over outer substrate 12, passes through the filler substrate 14, and forms into loops over outer substrate 16. Preferably, the stitching technique used to form the present composite is a loop pile sinker stitching. In particular, the loop pile stitches connect the layers together without substantially compressing fill layer 14. In this manner, the composite fabric product remains compressible, has a gel-like feel, and has good cushioning properties.

As shown in FIG. 3, loop pile stitching is not only well suited to being used in a three layer product, but also in a two layer product. For example, as shown in the two layer product illustrated in FIG. 3, loop pile stitches 30 are also capable of attaching to nonwoven fill layer 14 for creating a unitary structure.

The yarn used to form loop pile stitches 30 can vary depending upon the particular application and the desired result. In one embodiment, yarn 30 is a heat stable, low shrinkage yarn. The yarn can be made from various natural and synthetic materials and can have a denier over a relatively wide range. In one embodiment, the yarn is made from polyester fibers and has a denier from about 100 to about 200, and particularly has a denier of about 150.

As described above, loop pile stitches 30 can be constructed using a stitchbonding machine. The gauge of the machine and the stitch density can vary, again, depending upon the application. In general, however, the stitchbonding machine forms from about 12 to about 20 rows of stitches and particularly 14 rows of stitches per inch along the length of the composite fabric product. Each row can contain from about 7 to about 28 stitches per inch.

As is known to those of ordinary skill in the art, different loop stitching techniques as well as yarn types can be used to attach the outer substrates with the filler substrate to achieve a gel-like feel in accordance with the present invention.

Once the composite fabric of the present invention has been loop stitched as described above, various finishing steps can be performed in accordance with the present invention. For example, if desired, the fabric product can be heat set by being exposed to heat for a short period of time.

In an alternative embodiment, one or more surfaces of the composite fabric product can be sanded in order to create a surface with a softer feel. In this embodiment, the fabric product is brought into contact with a sanding device, such as with one or more sanding rolls, which lightly sand the loops formed by the loop pile sinker stitchbonding method. Specifically, the loops are frayed by the sanding device. For example, a fine sanding paper, such as having approximately 280 grit, is used to fray the loop stitches. Ultimately, a flannel feel by frazzling the created loops without breaking a majority of the loops is created.

The process and products of the present invention may be better understood by reference to the following example:

EXAMPLE 1

A composite was produced on a Liba GMBH stitch bonding machine. Both the top and bottom substrates were two bar warp knitted tricot fabrics, while the stitch yarn was 40 denier polyester. The filler substrate was composed of a hollow siliconized polyester fiber with 15 denier. A loop pile sinker stitching technique was used to connect the three substrates together with the filler substrate located in the middle as illustrated in FIG. 1. The loop pile sinker method utilized a 100 filament polyester yarn with a 150 denier. The loop stitches formed into the fabric composite attached the layers together without substantially compressing the fill layer. The resulting product was compressible offering good cushioning properties and had a gel-like feel.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A composite fabric product comprising:
   a first outer fabric layer;
   a second outer fabric layer;
   a fill layer positioned between said first outer layer and said second outer layer, said fill layer comprising a non-woven web containing siliconized fibers; and a plurality of stitches positioned in parallel rows without the rows intersecting connecting said first outer layer, said second outer layer and the fill layer together, said stitches connecting said layers together without substantially compressing said fill layer.

2. A composite fabric product as defined in claim 1, wherein said stitches comprises loop pile stitches.

3. A composite fabric product as defined in claim 1, wherein said siliconized fibers have a denier of from about 6 to about 30.

4. A composite fabric product as defined in claim 1, wherein said siliconized fibers comprise polyester fibers.

5. A composite fabric product as defined in claim 1, wherein said siliconized fibers comprise hollow fibers.

6. A composite fabric product as defined in claim 1, wherein said siliconized fibers have an openness value of from about 2.0 to about 4.0.

7. A composite fabric product as defined in claim 1, wherein said fill layer has a basis weight of from about 200 gsm to about 800 gsm.

8. A composite fabric product as defined in claim 2, wherein said plurality of stitches are positioned in rows, each row containing from about 7 to about 28 stitches per inch.

9. A composite fabric product as defined in claim 8, wherein said rows of stitches are spaced at a rate of from about 12 rows per inch to about 20 rows per inch.

10. A composite fabric product as defined in claim 1, wherein said stitches are formed from a heat stable yarn containing substantially no residual shrinkage.

11. A composite fabric product as defined in claim 1, wherein said plurality of stitches are formed from a yarn having a denier of from about 100 to about 200.

12. A composite fabric product comprising:
    a first outer layer;
    a fill layer positioned adjacent to said first outer fabric layer, said fill layer comprising a non-woven web containing siliconized fibers; and
    a plurality of stitches connecting said first outer fabric layer and said fill layer together, said stitches connecting said layers together without substantially compressing said fill layer, said stitches comprising loop pile stitches.

13. A composite fabric product as defined in claim 12, wherein said first outer layer comprises a warp knitted fabric.

14. A composite fabric product as defined in claim 12, wherein said fill layer comprises a carded and cross-lapped non-woven web.

15. A composite fabric product as defined in claim 12, wherein said siliconized fibers comprise polyester fibers having a denier of from about 6 to about 30.

16. A composite fabric product as defined in claim 15, wherein said polyester fibers are hollow.

17. A composite fabric product as defined in claim 12, further comprising a second fabric outer layer positioned adjacent to said fill layer, said fill layer being positioned between said first outer fabric layer and said second outer fabric layer.

18. A composite fabric product as defined in claim 12, wherein said plurality of stitches are positioned in rows, each row containing from about 7 to about 28 stitches per inch.

19. A composite fabric product as defined in claim 18, wherein said rows of stitches are spaced at a rate of from about 12 rows per inch to about 20 rows per inch.

20. A composite fabric product comprising:
    a first outer fabric layer;
    a second outer fabric layer;
    a fill layer positioned between said first outer fabric layer and said second outer fabric layer, said fill layer comprising a non-woven web, said non-woven containing fibers, said fibers having an openness value of from about 2.0 to about 4.0; and a plurality of stitches connecting said first outer layer, said second outer layer and said fill layer together, said stitches connecting said layers together without substantially compressing said fill layer, said plurality of stitches comprising loop pile stitches.

21. A composite fabric product as defined in claim 20, wherein said fill layer is comprised of polyester fibers.

22. A composite fabric product as defined in claim 21, wherein said polyester fibers comprise siliconized fibers, said fibers having a denier of from about 6 to about 30.

23. A composite fabric product as defined in claim 20, wherein said fill layer has a basis weight of from about 200 gsm to about 800 gsm.

24. A composite fabric product as defined in claim 20, wherein said first outer fabric layer and said second outer fabric layer comprises knitted fabrics.

25. A composite fabric product as defined in claim 20, wherein said plurality of stitches are positioned in rows, each row containing from about 7 to about 28 stitches per inch, said rows being spaced at a rate of from about 12 rows per inch to about 20 rows per inch.

26. A composite fabric product as defined in claim 20, wherein at least one side of said product has been sanded.

27. A composite fabric product as defined in claim 20, wherein said fibers contain from about 5 to about 15 crimps per inch.

28. A composite fabric product as defined in claim 20, wherein said fibers contain at least 8 crimps per inch.

29. A composite fabric product as defined in claim 28, wherein said fibers have an openness value of at least 2.5.

* * * * *